(12) United States Patent
Naito

(10) Patent No.: US 8,988,709 B2
(45) Date of Patent: Mar. 24, 2015

(54) MODEM CONTROL APPARATUS, CONTROL METHOD THEREOF, AND STORAGE MEDIUM

(75) Inventor: Yosui Naito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 13/292,557

(22) Filed: Nov. 9, 2011

(65) Prior Publication Data

US 2012/0154873 A1 Jun. 21, 2012

(30) Foreign Application Priority Data

Dec. 15, 2010 (JP) ................................. 2010-279870

(51) Int. Cl.
*G06F 3/12* (2006.01)
*H04M 11/06* (2006.01)
*H04N 1/327* (2006.01)

(52) U.S. Cl.
CPC ......... *H04M 11/066* (2013.01); *H04N 1/32708* (2013.01); *H04N 1/32726* (2013.01); *H04N 1/32741* (2013.01); *H04N 2201/0093* (2013.01); *H04N 2201/0094* (2013.01)
USPC ......... 358/1.15; 358/1.13; 358/468; 358/438; 455/560

(58) Field of Classification Search
CPC .......... H04N 1/33323; H04N 1/33392; H04N 1/32719; H04N 2201/33342; H04M 2203/657; H04M 2203/2066; H04M 11/066; H04M 2201/52
USPC ............... 358/1.13, 1.15, 400, 468, 435, 438, 358/439; 455/557, 560
See application file for complete search history.

(56) References Cited

U.S. PATENT DOCUMENTS

| 4,991,197 | A | * | 2/1991 | Morris | 455/557 |
| 6,011,968 | A | | 1/2000 | Patel et al. | 455/414 |
| 2002/0098865 | A1 | * | 7/2002 | Jang et al. | 455/557 |
| 2004/0171370 | A1 | * | 9/2004 | Natarajan | 455/413 |

FOREIGN PATENT DOCUMENTS

| CN | 101159802 A | 4/2008 |
| CN | 101505354 A | 8/2009 |
| EP | 2254321 A1 | 11/2010 |
| JP | 10-42062 A | 2/1998 |

OTHER PUBLICATIONS

Controlling your Modem with AT Commands, May 6, 1999, Zoltrix International Limited, pp. 4 and 5.*

(Continued)

*Primary Examiner* — Jamares Q Washington
(74) *Attorney, Agent, or Firm* — Fitzpatrick, Cella, Harper & Scinto

(57) ABSTRACT

This invention provides a mechanism which can attain at least one of an accurate measurement of a T0 timer and appropriate control of a CNG output timing in a FAX communication using AT commands. To accomplish this, in a modem control apparatus for controlling a modem using AT commands, the modem is set in a voice mode, an AT command including a dial number is sent to the modem set in the voice mode, the modem is set in a facsimile mode after completion of the dialing in the modem, and an AT command including no dial number is sent to the modem set in the facsimile mode so as to control the modem to begin to output a calling tone.

17 Claims, 3 Drawing Sheets

(56) References Cited

OTHER PUBLICATIONS

International Telecommunication Union, ITU-T Recommendation T.30, "Series T: Terminals for Telematic Services, Procedures for documents facsimile transmission in the general switched telephone network", Sep. 2005, 322 pages.

European Patent Office, European Search Report mailed May 3, 2012, in connection with European Patent Application No. 11 00 9066, 4 pages.

* cited by examiner

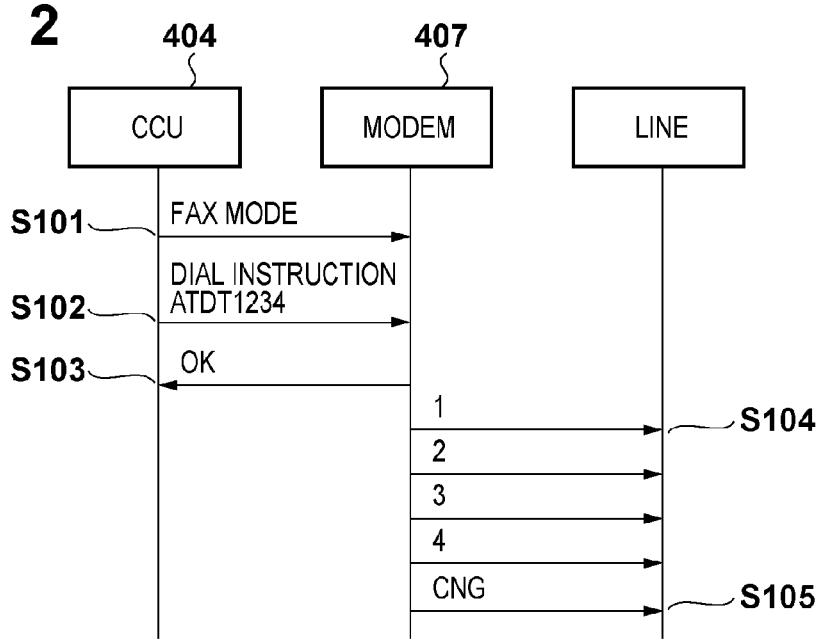
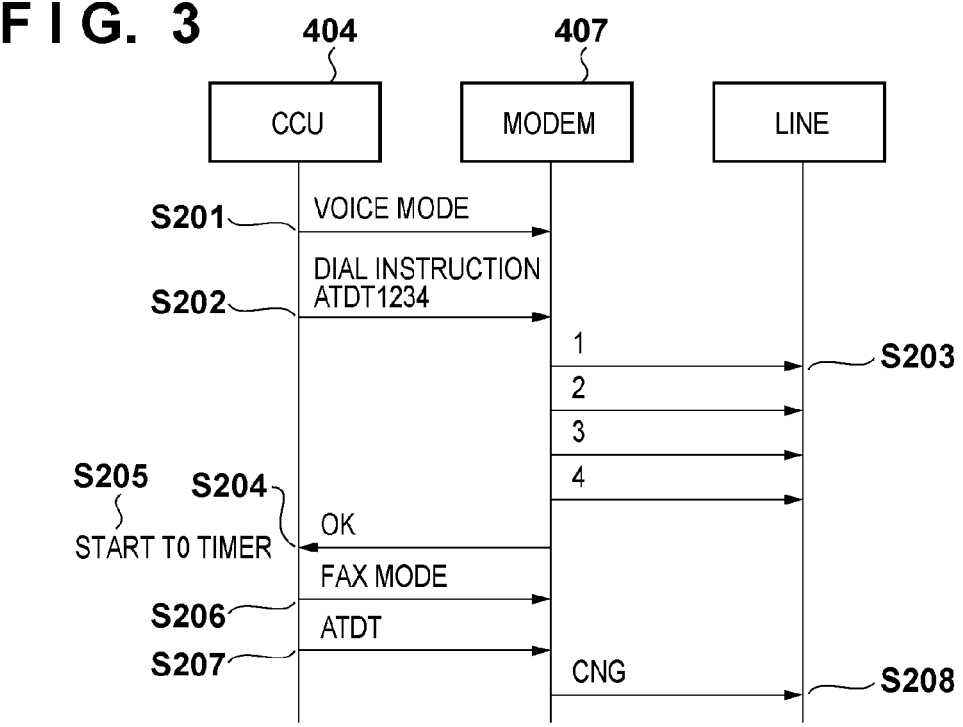

MODEM CONTROL APPARATUS, CONTROL METHOD THEREOF, AND STORAGE MEDIUM

BACKGROUND OF THE INVENTION

1. Field of the Invention

The present invention relates to a modem control apparatus, control method thereof, and storage medium.

2. Description of the Related Art

An AT modem is that which incorporates a controller, and is of a type which makes modem control by an AT command set. The AT command set is the world's most popular modem command system advocated by Hays Microcomputer Products, U.S.A. Using commands starting with "AT (Attention)", the controller can easily operate all of modem sending and receiving functions. Note that Japanese Patent Laid-Open No. 10-042062 has proposed a method of switching a modem mode between those at the times of dialing and communications upon making data communications between terminals using AT modems.

It is difficult for an AT modem to execute flexible control that requires realtimeness required for facsimile (FAX) communications unlike in a controller-less type modem for which a controller on the apparatus side executes thorough modem control. AT modems are popularly adopted as data modems for PCs, but they are not adopted very much as FAX modems. For this reason, when an AT modem is used, control required for FAX communications cannot often be accurately executed.

For example, T0 timer control at the time of FAX sending is one of such difficulties. In this case, a T0 timer measures a reception waiting time of a procedure signal from a partner apparatus of a FAX communication after completion of dialing of a partner telephone number. The T0 timer is specified by approval tests of respective countries, and if it is not accurately controlled, approval cannot be received. Therefore, accurate control of the T0 timer is very important. In the AT modem, an AT command used to execute dialing is "ATD". Immediately after reception of this command (before a dial number is output onto a line), the AT modem returns a result. Hence, a controller on the apparatus side (CCU: Communication Control Unit) cannot correctly detect a dialing end timing, and the T0 timer cannot be accurately measured. For example, when a dial number of 20 digits is output onto a pulse line of 10 PPS, 20 sec or more are required at a maximum. Since a time required to output a dial number changes considerably depending on a line type (tone or pulse) and the number of digits of the dial number, the standard cannot often be satisfied if the measurement of the T0 timer is started from the issuance timing of the ATD command.

As a feature of the AT modem, when a dial command is issued, an output of a calling tone (CNG) is automatically started after completion of dialing, and a FAX procedure unwantedly begins. This means that the CCU cannot control the CNG output timing. At the time of occurrence of a communication trouble, it is very effective to control the CNG output timing. However, the AT modem cannot change the CNG output timing, thus posing a problem.

Note that Japanese Patent Laid-Open No. 10-042062 above cannot solve these problems since it can only switch a modem mode between those at the times of dialing and communications.

SUMMARY OF THE INVENTION

The present invention enables realization of a mechanism which can attain at least one of an accurate measurement of a T0 timer and appropriate control of a CNG output timing in a FAX communication using AT commands.

One aspect of the present invention provides a modem control apparatus for controlling a modem using AT commands, comprising: a first setting unit that sets the modem in a voice mode; a first sending unit that sends an AT command including a dial number to the modem set in the voice mode so as to control the modem to start dialing; a receiving unit that receives a notification indicating completion of the dialing from the modem; a second setting unit that sets the modem in a facsimile mode when the receiving unit has received the notification; and a second sending unit that sends an AT command including no dial number to the modem set in the facsimile mode so as to control the modem to begin to output a calling tone.

Another aspect of the present invention provides a control method of a modem control apparatus for controlling a modem using AT commands, comprising: controlling a first setting unit to set the modem in a voice mode; controlling a first sending unit to send an AT command including a dial number to the modem set in the voice mode so as to control the modem to start dialing; controlling a receiving unit to receive a notification indicating completion of the dialing from the modem; controlling a second setting unit to set the modem in a facsimile mode when the notification has been received in the controlling the receiving unit; and controlling a second sending unit to send an AT command including no dial number to the modem set in the facsimile mode so as to control the modem to begin to output a calling tone.

Still another aspect of the present invention provides a computer-readable storage medium storing a computer program for controlling a computer to execute respective steps in a control method of the modem control apparatus.

Further features of the present invention will be apparent from the following description of exemplary embodiments with reference to the attached drawings.

BRIEF DESCRIPTION OF THE DRAWINGS

FIG. 2 is a sequence chart showing a command sequence when dialing is executed in a FAX mode as a comparative example;

FIG. 3 is a sequence chart showing a command sequence when mode switching is done before and after execution of dialing according to the embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Image Processing Apparatus>

Figure 1:
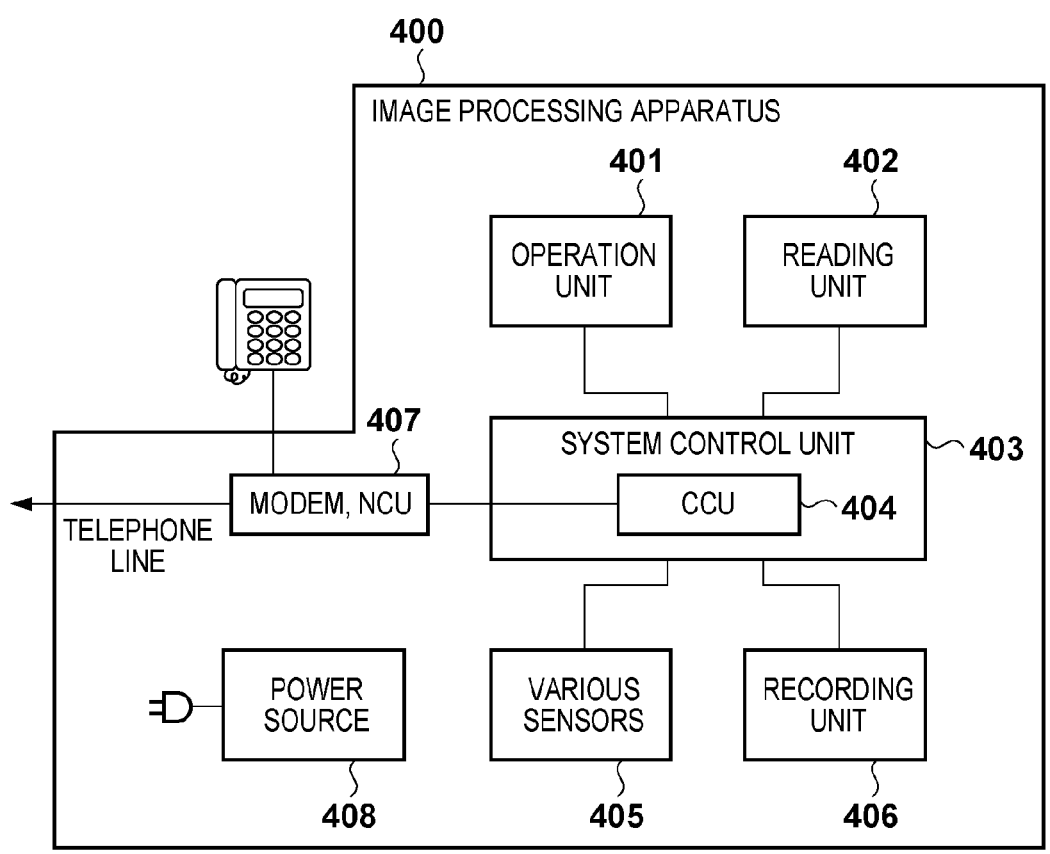
FIG. 1 is a block diagram showing an example of the arrangement of an image processing apparatus according to an embodiment of the present invention.

The arrangement of an image processing apparatus (modem control apparatus) will be described first with reference to FIG. 1. The image processing apparatus of the present invention can be implemented as, for example, an apparatus such as a facsimile (FAX) apparatus or MFP (Multi Function Peripheral), which has a FAX function using AT commands.

An image processing apparatus 400 includes an operation unit 401, reading unit 402, system control unit 403, various sensors 405, recording unit 406, modem 407, and power source 408. The system control unit 403 includes a CCU (Communication Control Unit) 404.

The operation unit 401 is configured by a keyboard, display unit, and the like, and is used by an operator to make various input operations. The reading unit 402 reads an image from a document, and executes encoding processing of read image data and that to be handled by the image processing apparatus. The system control unit 403 controls the overall image processing apparatus. The CCU 404 is a communication control unit for controlling the modem 407.

The various sensors 405 include a detection sensor used to detect a document size, and inform the system control unit 403 of the detection results of the sensors. The recording unit 406 records a received image and file data on paper media. The modem 407 demodulates a modulated signal from a line. Conversely, the modem 407 modulates a signal from the apparatus, and outputs the modulated signal onto the line. In the present invention, an AT modem is used as the modem 407. In recent years, modems that each have a NCU (Network Control Unit) function are on the rise. The power source 408 supplies electric power to the image processing apparatus 400.

<Sequence as Comparative Example>

A sequence upon execution of dialing in a facsimile (FAX) mode in a FAX communication using the AT modem will be described below with reference to FIG. 2. In step S101, the CCU 404 instructs the modem 407 to set a FAX mode. In step S102, the CCU 404 instructs the modem 407 to execute dialing. In the AT modem, an AT command used to execute dialing is "ATD". A letter "T" for tone dialing or "P" for pulse dialing is appended after this command, and a telephone number is then appended after that letter. Therefore, the CCU 404 issues, for example, an AT command "ATDT04412345678" to the modem 407.

Immediately after reception of the AT command in step S102, the modem 407 returns a result (OK) notification to the CCU 404 in step S103. After that, in step S104, the modem 407 begins to output a dial number. Upon completion of dialing, the modem 407 automatically outputs a calling tone (CNG) in step S105.

In this manner, when the AT modem issues an AT command in the FAX mode, since a result notification is immediately returned from the modem 407, the CCU 404 on the apparatus side cannot be correctly detect the dialing end timing. As a result, a T0 timer cannot be accurately measured, thus posing a problem. In this case, the T0 timer measures a reception waiting time of a procedure signal from a partner apparatus of a FAX communication after completion of dialing of a partner telephone number. In this embodiment, when an elapsed time of the T0 timer exceeds a predetermined time, it is judged that an arbitrary problem has occurred, and the T0 timer can be used to release a line currently captured by the modem 407. For example, upon outputting a dial number of 20 digits onto a pulse line of 10 PPS, 20 sec or more are required at a maximum. Therefore, since a time required to output a dial number changes considerably depending on a line type (tone or pulse) and the number of digits of the dial number, the standard in each country cannot often be satisfied if the measurement of the T0 timer is started from the issuance timing of the ATD command.

When the AT modem issues a dial command, a CNG output is automatically started after completion of dialing, and a FAX procedure unwantedly begins. This means that the CCU 404 cannot control the CNG output timing. It is very important to control the CNG output timing at the time of occurrence of a communication error. A FAX communication using the AT modem according to this embodiment, which can solve these problems, will be described below.

<Sequence in this Embodiment>

A FAX communication using the AT modem according to this embodiment will be described below with reference to FIG. 3. In this embodiment, a FAX communication is started in a voice mode. More specifically, the mode of the modem 407 is switched before and after dialing.

In step S201, the CCU 404 sends an AT command used to set the modem 407 in the voice mode to the modem 407 before dialing required to make a FAX communication. Then, in step S202, the CCU 404 sends an AT command to the modem 407 to issue a dialing instruction.

Upon reception of the AT command, the modem 407 begins to output a dial number onto a line in step S203. Unlike in FIG. 2, the modem 407 does not return any result notification to the dial command to the CCU 404 yet in this step. After that, upon completion of the output of the last dial number digit, the modem 407 returns a result (OK) notification to the CCU 404 in step S204.

Upon receiving the result notification, the CCU 404 begins to count the T0 timer in step S205. Thus, the T0 timer can be accurately measured irrespective of a time required to output a dial number. In the voice mode, the modem 407 does not automatically begin to output the CNG after completion of dialing. Therefore, in step S206, the CCU 404 sets the modem 407 in the FAX mode after completion of dialing, so as to start to output the CNG. Note that details of the T0 timer will be described later with reference to FIG. 4.

Subsequently, in step S207, the CCU 404 outputs an "ATDT" command with an empty dial number to the modem 407. After that, since the modem 407 receives the AT command with an empty dial number, it outputs the CNG in step S208 in the same manner as completion of dialing in step S104 in FIG. 2.

<Processing Sequence>

Figure 4:
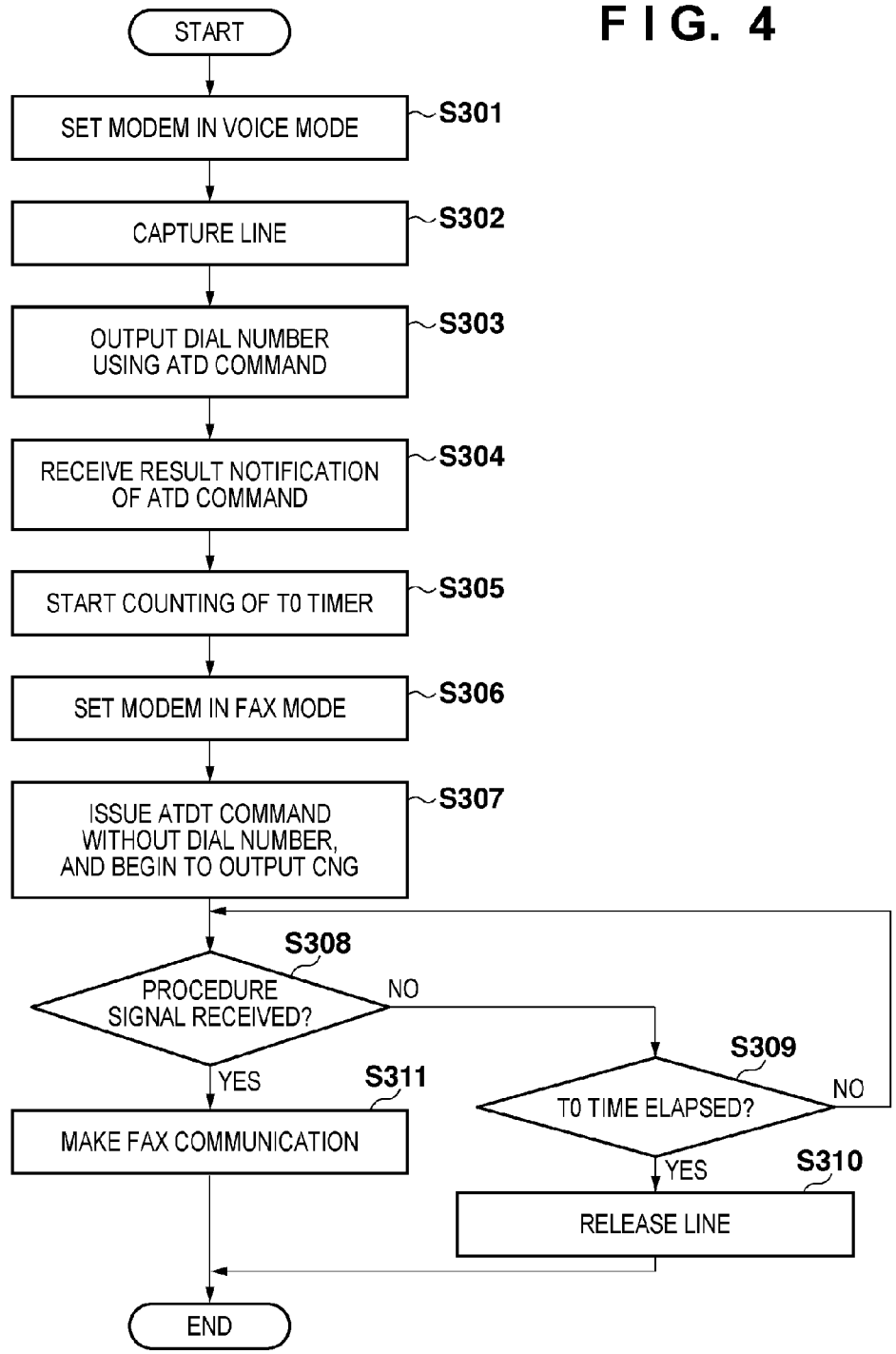
FIG. 4 is a flowchart showing an example of modem control according to the embodiment.

The processing sequence of the CCU 404 in a FAX communication using the AT modem according to this embodiment will be described below with reference to FIG. 4. In step S301, the CCU 404 serves as a first setting unit, and sets the modem 407 in the voice mode. In step S302, the CCU 404 sends a line capturing instruction to the modem 407. At this time, the modem 407 captures a line.

In step S303, the CCU 404 serves as a first sending unit, and sends a dial command (AT command) to the modem 407. At this time, the modem 407 begins to output a dial number onto the line. Upon completion of the output of the dial number, the modem 407 returns a result notification to the CCU 404. Therefore, in step S304, the CCU 404 serves as a receiving unit, and receives the result notification. Upon reception of the result notification, the CCU 404 serves as a timer unit, and begins to count the T0 timer in step S305.

In step S306, the CCU 404 serves as a second setting unit, and sets the modem 407 in the FAX mode. In step S307, the CCU 404 serves as a second sending unit, and sends a dial command "ATDT" with an empty dial number to the modem 407. Thus, the modem 407 begins to output the CNG onto the line.

Note that after completion of the process in step S304, the control may wait for a predetermined time as needed before processes in steps S305 to S307 are started. For example, this wait control is executed to cope with the following case. In recent years, FAX communications via an IP network are increasing. As an example of a FAX communication mode via the IP network, a FAX apparatus is connected to a VoIP router, which establishes a connection with an ISP (Internet Service Provider), and a FAX communication is then made via the Internet.

In the IP network, communication rates of packets to be transferred are not constant, and the packets to be transferred often suffer arrival timing differences (fluctuations) to the VoIP router on the receiver side due to network traffics and troubles in the middle of the IP network. When a degree of fluctuation is large, or when a packet loss occurs in the IP network, the VoIP router cannot often restore a signal waveform sampled on the sender side.

To solve this problem, in communications on the IP network, QoS (Quality of Service) is available as a technique for guaranteeing a constant communication rate for a specific communication by reserving a band for the specific communication or giving priorities to packets. The QoS is applied to communications such as voice communications and video conferences which require realtimeness. Also, many IP networks apply this QoS to FAX communications which require realtimeness in procedure signals and image signals, and are vulnerable to instantaneous interruptions due to, for example, packet losses. When the QoS is applied to FAX communications, since band guarantee and priority control are executed, the aforementioned communication troubles caused by packet delays and losses can be prevented.

In this case, the aforementioned VoIP router generally starts the QoS to have detection of the CNG as a trigger. However, some VoIP routers begin to detect the CNG several sec after establishment of a line. When a FAX apparatus is connected to such VoIP router, a CED (called station identification signal) from a receiving FAX apparatus may be received to stop outputting of the CNG before the VoIP router detects the CNG. In this case, since the VoIP router does not detect any CNG, the QoS is not executed consequently.

Hence, after the dial number is output, the CNG begins to output after an elapse of several sec (to start CED detection simultaneously), so as to control the VoIP router to reliably detect the CNG. When the AT modem is used by sending a dial command in the voice mode like in this embodiment, the CNG output start timing can also be delayed, thus coping with the aforementioned problem.

Referring back to FIG. 4, the CCU 404 determines in step S308 whether or not a procedure signal is received from a partner apparatus in the FAX communication. If the procedure signal is received, the process advances to step S311, and the CCU 404 starts the FAX communication. If no procedure signal is received, the process advances to step S309, and the CPU 404 checks the count value of the T0 timer to determine whether or not a T0 time has elapsed. If the T0 time has not elapsed yet, the process returns to step S308; otherwise, the process advances to step S310. In step S310, the CCU 404 serves as an instruction unit. Hence, the CCU 404 judges that any problem has occurred since no procedure signal (response) is received although the T0 time has elapsed, and sends an instruction to release the captured line to the modem 407.

As described above, in the image processing apparatus according to this embodiment, since completion of dialing in the modem can be accurately detected, the T0 timer can be accurately counted, thus satisfying the approval standards of respective countries. Also, the CCU can control the CNG start timing, and a communication trouble for which a change in CNG output timing is effective can be coped with.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279870 filed on Dec. 15, 2010, which is hereby incorporated by reference herein in its entirety.

What is claimed is:

1. A modem control apparatus for controlling a modem using AT commands, comprising:
   a first setting unit that sets the modem in a voice mode;
   a first sending unit that sends an AT command including a dial number to the modem set in the voice mode so as to control the modem to start dialing by a captured line;
   a receiving unit that receives a notification indicating completion of the dialing from the modem;
   a second setting unit that sets the modem in a facsimile mode in accordance with the notification received by said receiving unit;
   a timer unit that starts measurement of a time in accordance with the notification received by the receiving unit;
   a second sending unit that sends an AT command including no dial number to the modem set in the facsimile mode so as to control the modem to begin to output a calling signal;
   an instruction unit that instructs the modem to release the captured line in a case where a predetermined response is not returned from an apparatus on a communication partner side and the time measured by said timer unit exceeds a predetermined time; and
   a communication unit that performs a fax communication in a case where the predetermined response is returned.

2. The apparatus according to claim 1, wherein said second sending unit sends the AT command including no dial number after an elapse of a predetermined time since reception of the notification by said receiving unit.

3. A control method of a modem control apparatus for controlling a modem using AT commands, comprising:
   setting the modem in a voice mode;
   sending an AT command including a dial number to the modem set in the voice mode so as to control the modem to start dialing by a capture line;
   receiving a notification indicating completion of the dialing from the modem;
   setting the modem in a facsimile mode in accordance with the received notification; and
   starting measurement of a time in accordance with the received notification;
   sending an AT command including no dial number to the modem set in the facsimile mode so as to control the modem to begin to output a calling signal;
   instructing the modem to release the captured line in a case where a predetermined response is not returned from an apparatus on a communication partner side and the measured time exceeds a predetermined time; and performing a fax communication in a case where the predetermined response is returned.

4. A non-transitory computer-readable storage medium storing a computer program for controlling a computer to execute respective steps in a control method of a modem control apparatus of claim 3.

5. The apparatus according to claim 1, wherein the predetermined response is a CED.

6. The apparatus according to claim 1, wherein the calling signal is a CNG.

7. The apparatus according to claim 1, further comprising
a response receiving unit that receives the predetermine response from the apparatus on the communication partner side; and
a determining unit that determines whether the predetermined response is received by the response receiving unit,
wherein the instruction instructs the modem to release the captured line in a case where the determining unit determines that the predetermined response is not received by the response receiving unit and the time measured by said timer unit exceeds a predetermined time, and
wherein the communication unit executes the fax communication in a case where the determining unit determines that the predetermined response is received by the response receiving unit.

8. A modem control apparatus for controlling a modem using AT commands, comprising:
a first sending unit that sends, to the modem, an AT command for setting the modem in a voice mode;
a second sending unit that sends, to the modem set in the voice mode, an AT command including a dial number so as to control the modem to start dialing by a captured line;
a receiving unit that receives a notification indicating completion of the dialing from the modem;
a third sending unit that sends, to the modem, an AT command for setting the modem in a facsimile mode in accordance with the notification received by said receiving unit; and
a timer unit that starts measurement of a time in accordance with the notification received by the receiving unit;
a fourth sending unit that sends an AT command including no dial number to the modem set in the facsimile mode so as to control the modem to begin to output a calling signal;
an instruction unit that instructs the modem to release the captured line in a case where a predetermined response is not returned from an apparatus on a communication partner side and the time measured by said timer unit exceeds a predetermined time; and
a communication unit that performs a fax communication in a case where the predetermined response is returned.

9. The apparatus according to claim 8, wherein said second sending unit sends the AT command including no dial number after an elapse of a predetermined time since reception of the notification by said receiving unit.

10. The apparatus according to claim 8, wherein the predetermined response is a CED.

11. The apparatus according to claim 8, wherein the calling signal is a CNG.

12. The apparatus according to claim 8, further comprising
a response receiving unit that receives the predetermine response from the apparatus on the communication partner side; and
a determining unit that determines whether the predetermined response is received by the response receiving unit,
wherein the instruction instructs the modem to release the captured line in a case where the determining unit determines that the predetermined response is not received by the response receiving unit and the time measured by said timer unit exceeds a predetermined time, and
wherein the communication unit executes the fax communication in a case where the determining unit determines that the predetermined response is received by the response receiving unit.

13. A modem control apparatus for controlling a modem using AT commands, comprising:
a first sending unit that sends, to the modem, a sending signal command for setting the modem in a voice mode;
a second sending unit that sends, to the modem set in the voice mode, a sending signal command including a dial number so as to control the modem to start dialing by a captured line;
a receiving unit that receives a notification indicating completion of the dialing from the modem;
a third sending unit that sends, to the modem, a sending signal command for setting the modem in a facsimile mode in accordance with the notification received by said receiving unit; and
a timer unit that starts measurement of a time in accordance with the notification received by the receiving unit;
a fourth sending unit that sends a sending signal command including no dial number to the modem set in the facsimile mode so as to control the modem to begin to output a calling signal;
an instruction unit that instructs the modem to release the captured line in a case where a predetermined response is not returned from an apparatus on a communication partner side and the time measured by said timer unit exceeds a predetermined time; and
a communication unit that performs a fax communication in a case where the predetermined response is returned.

14. The apparatus according to claim 13, wherein said second sending unit sends the sending signal command including no dial number after an elapse of a predetermined time since reception of the notification by said receiving unit.

15. The apparatus according to claim 13, wherein the predetermined response is a CED.

16. The apparatus according to claim 13, wherein the calling signal is a CNG.

17. The apparatus according to claim 13, further comprising
a response receiving unit that receives the predetermined response from the apparatus on the communication partner side; and
a determining unit that determines whether the predetermined response is received by the response receiving unit,
wherein the instruction instructs the modem to release the captured line in a case where the determining unit determines that the predetermined response is not received by the response receiving unit and the time measured by said timer unit exceeds a predetermined time, and
wherein the communication unit executes the fax communication in a case where the determining unit determines that the predetermined response is received by the response receiving unit.

* * * * *